United States Patent
Na et al.

(10) Patent No.: US 9,430,806 B2
(45) Date of Patent: Aug. 30, 2016

(54) ELECTRONIC DEVICE AND METHOD OF OPERATING THE SAME

(71) Applicant: Samsung Electronics Co., Ltd., Gyeonggi-do (KR)

(72) Inventors: Jin-Hee Na, Seoul (KR); Ki-Huk Lee, Gyeonggi-do (KR); Young-Kwon Yoon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/203,968

(22) Filed: Mar. 11, 2014

(65) Prior Publication Data

US 2014/0270372 A1    Sep. 18, 2014

(30) Foreign Application Priority Data

Mar. 14, 2013 (KR) ........................ 10-2013-0027579

(51) Int. Cl.
G06K 9/00 (2006.01)
G06T 1/00 (2006.01)
H04N 5/265 (2006.01)
G06K 9/62 (2006.01)

(52) U.S. Cl.
CPC ............. *G06T 1/00* (2013.01); *G06K 9/00335* (2013.01); *G06K 9/6212* (2013.01); *H04N 5/265* (2013.01)

(58) Field of Classification Search
None
See application file for complete search history.

(56) References Cited

U.S. PATENT DOCUMENTS

| 2007/0086675 A1 | 4/2007 | Chinen et al. |
| 2008/0080779 A1 | 4/2008 | Nakanishi |
| 2008/0088711 A1* | 4/2008 | Border et al. ............. 348/222.1 |
| 2009/0257662 A1* | 10/2009 | Rudin et al. .................. 382/218 |
| 2011/0069906 A1* | 3/2011 | Park et al. .................... 382/284 |
| 2011/0149106 A1 | 6/2011 | Kino |
| 2011/0235866 A1 | 9/2011 | Endo et al. |
| 2013/0236073 A1* | 9/2013 | Piratla et al. ................. 382/128 |
| 2014/0368669 A1* | 12/2014 | Talvala ................ G06T 7/0081 348/207.1 |
| 2014/0376830 A1* | 12/2014 | Hyvarinen .................... 382/284 |

FOREIGN PATENT DOCUMENTS

| KR | 2002-0090095 A | 11/2002 |
| KR | 10-2010-0013700 A | 2/2010 |
| WO | 2011/152841 A1 | 12/2011 |

OTHER PUBLICATIONS

Microsoft Device Team (NPL: "They used to say that a camera was only as good as the photographer using it but with the latest imaging technology in your Nokia Lumia 920 and Lumia 820 practically anyone can take great photos all the time", Microsoft Devices Blog, Dec. 12, 2012, pp. 15, hereafter referred to as Microsoft).*

S.M. Smith, Asset-2: Real-Time Motion Segmentation and Shape Tracking, 1995, pp. 237-244, Defence Research Agency, Farnborough, Hampshire GU14, 6TD, UK.

* cited by examiner

*Primary Examiner* — Bhavesh Mehta
*Assistant Examiner* — Oneal R Mistry
(74) *Attorney, Agent, or Firm* — Cha & Reiter, LLC (57) ABSTRACT

A method and apparatus for image processing includes receiving images, detecting non-stationary objects in the images, displaying a first image that includes a non-stationary object, selecting a frame region including the non-stationary object in the first image, selecting a second image based on a low similarity with the first image, and replacing image data in the frame region of the first image with image data represented in the frame region of the second image.

17 Claims, 9 Drawing Sheets

ELECTRONIC DEVICE AND METHOD OF OPERATING THE SAME

CLAIM OF PRIORITY

This application claims priority under 35 U.S.C. §119 to an application filed in the Korean Intellectual Property Office on Mar. 14, 2013 and assigned Serial No. 10-2013-0027579, the contents of which are incorporated herein by reference.

BACKGROUND

1. Technical Field

The present disclosure relates generally to image analysis, and more particularly to image transformation.

2. Description of the Related Art

User devices such as a cellular phones, tablet computers, personal digital assistants, and laptop computers, are a necessity of modern life and an important means for finding, storing and using information. These user devices typically possess a graphical user interface (GUI) and touch-screen environment, and provide easy and reliable access to computing services, including business tasks, entertainment-based multimedia services and network access.

Almost all user devices are now equipped with cameras as a standard feature. Specialized hardware and software typically provides various photographic functionality for capturing images using the camera. Finally, the user device cameras are advantageous because the ubiquity and portability of the user devices allow users to capture photographs on a moment's notice.

SUMMARY

The present invention provides an image processing method and apparatus capable of receiving images captured by an image sensor, detecting non-stationary objects in the images, selecting a first image including a non-stationary object, selecting a frame region including the non-stationary object in the first image, replacing image data in the frame region of the first image with image data from the frame region of the second image, and displaying the first image with the replaced image on the display.

Another aspect of the present invention is to provide an image processing method and apparatus allowing a user to identify a frame region and replace image data within that frame region.

Another aspect of the present invention is to provide an electronic device capable of replacing image data in a region with image data from another image, when an image from consecutively photographed or captured images is displayed on a screen, and the region selected by a user includes at least some image data representing non-stationary objects.

According to one aspect of the present invention, an image processing method includes receiving images capturing a scene, each image taken at a different time, detecting a non-stationary object in the images, selecting a first image including the non-stationary object, selecting a frame region including the non-stationary object in the first image, selecting a second image having a low similarity with the first image, replacing image data in the frame region of the first image with image data from the frame region of the second image, and displaying the first image with the replaced image data on a display.

According to another aspect of the present invention, an electronic device includes an obtaining module configured to receive a plurality of images of a scene, a detection module configured to detect a non-stationary object in the plurality of images and measure similarity between images in the plurality of images, a region module configured to select a frame region designating the non-stationary object, a manipulation module configured to replace image data of the frame region in a first image of the plurality of images with image data of the frame region from a second image of the plurality of images when the second image has low similarity to the first image, and a display configured to display the first image with the replaced image data.

According to yet another aspect of the present invention, an electronic device includes at least one processor, at least one display, at least one memory, and at least one program stored in the memory and configured to be executable by the at least one processor to receive images capturing a scene, each image taken at a different time, detect a non-stationary object image data in the images, select a first image including the non-stationary object, select a frame region including the non-stationary object in the first image, select a second image having a low similarity with the first image, replace image data represented in the frame region of the first image with image data in the frame region of the second image, and display the first image with the replaced image data on the display.

BRIEF DESCRIPTION OF THE DRAWINGS

The above features and advantages of the present invention will become more apparent from the following detailed description when taken in conjunction with the accompanying drawings in which.

DETAILED DESCRIPTION

Preferred embodiments of the present invention will be described herein below with reference to the accompanying drawings. For the purposes of clarity and simplicity, detailed descriptions of well-known functions or constructions will be omitted as they would obscure the invention in unnecessary detail. Also, the terms used herein are defined according to the functions of the present invention. Thus, the terms may vary depending on user or operator's intentions or practices. Therefore, the terms used herein must be understood based on the descriptions made herein.

Briefly, the present invention discloses a method and apparatus to conduct image processing on a plurality of images. A consecutive sequence of images is taken, capturing the same scene at different times. "Non-stationary objects" may be captured among the plurality of images, these non-stationary objects being for example, people, animals, cars, and other moving objects. It is the goal of the present invention to enable the removal of one or more of the non-stationary objects from one of the images in the plurality of images. This may be done by defining a frame region in one picture that contains a non-stationary object, and replacing it when the same frame region from another picture in the plurality of images that does not contain the non-stationary object. By repeating this process for one or more non-stationary objects, one or more non-stationary objects may be removed from the picture, creating a final single picture that is a composite of two or more images from the plurality of images, lacking the undesired non-stationary objects.

Figure 1:
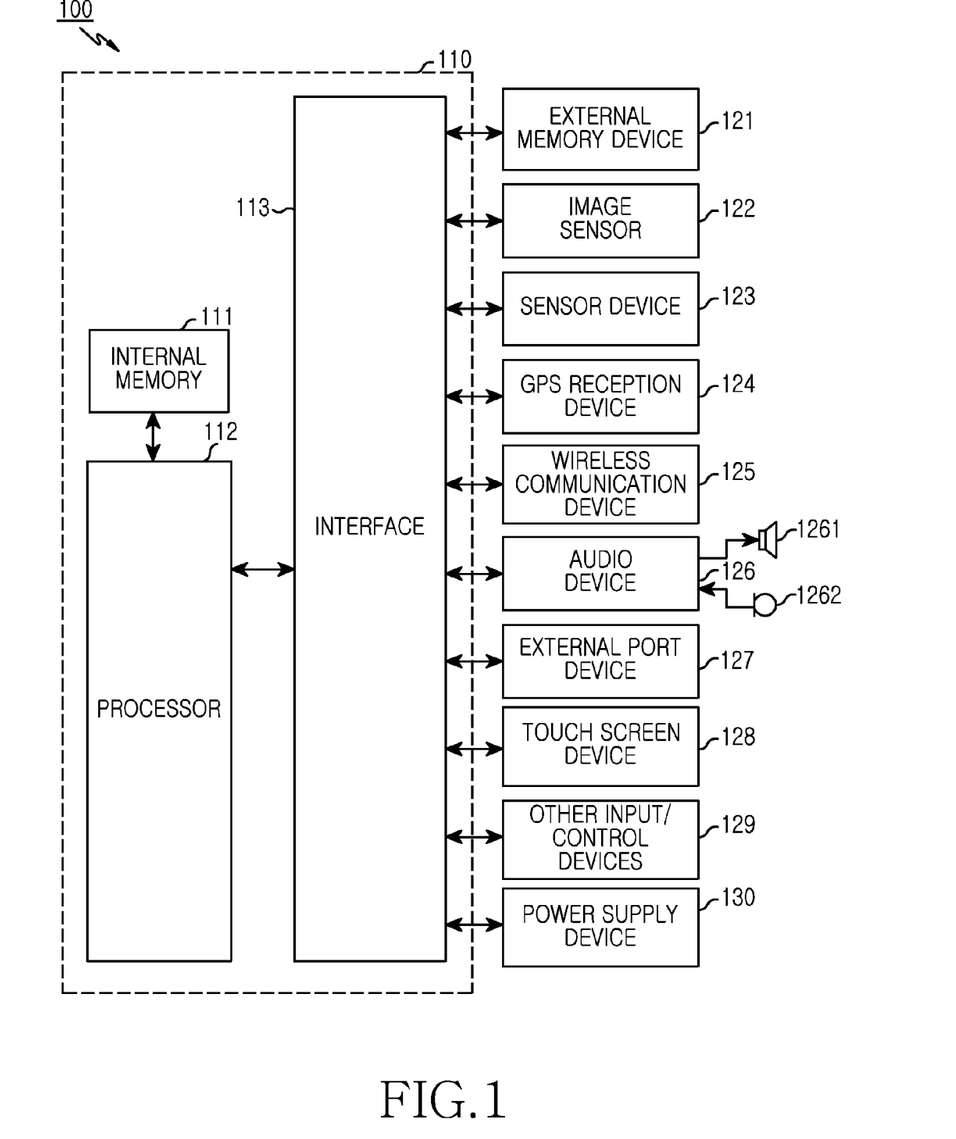
FIG. 1 is a block diagram of a user device according to an embodiment of the present invention.

FIG. 1 illustrates a block diagram of a user device according to an embodiment of the present invention.

The user device 100 may be a mobile phone, a mobile pad, a media player, a tablet computer, a handheld computer, or a personal digital assistant (PDA) or some similar portable computing device. Additionally, the user device 100 may be any mobile terminal including a device having two or more functions combined from the above-described devices.

The user device 100 may include a host device 100, an external memory device 121, an image sensor 122, a sensor device 123, a global position system (GPS) reception device 124, a wireless communication device 125, an audio device 126, an external port device 127, a touch screen device 128, other input/control devices 129, and a power supply device 130. The external memory device 121 and the external port device 127 may each be formed in plural.

The host device 110 may include an internal memory 111, one or more processors 112, and an interface 113. The internal memory 111, the one or more processors 112, and the interface 113 may be separate elements or they may be formed into one or more integrated circuits.

The processor 112 may execute various software programs to perform various functions for the user device 100, and perform a process and a control for voice, video, and data communications. Furthermore, the processor 112 may execute software programs (i.e., instruction sets), stored in the internal memory 111 and/or the external memory device 121, to perform various functions corresponding to the executed programs. For example, the processor 112 may execute and/or coordinate operations with the software programs stored in the internal memory 111 and/or the external memory device 121 to perform an embodiment of the invention described herein. Also, the processor 112 may include one or more application processor unit (APU), a graphic processor unit (GPU), an audio processor unit, and a communication processor unit, etc.

The application processor unit may drive an operating system (OS) and the various features, functions, controls and interfaces, etc. of the user device 100. The application processor unit may be formed of one chip having various integrated functions, such as a processor core, a memory unit, a display system/controller, a multimedia codec, a 2D/3D acceleration engine, an image signal processor, a camera, an audio, a modem, a high and low speed serial/parallel connectivity interface, etc. The application processor unit may be a "system-on-chip" having functions integrated into one, in which case, as described above, the functions may include driving an OS and a variety of applications, controlling various systems and coordinating the function of various devices/interfaces.

The graphic processor unit may process graphic-related operations, such as graphics acceleration, signal conversion, and screen output, etc. The graphic processor unit may resolve the so-called "bottleneck" phenomenon caused by intense graphic processing by the application processor unit, and therefore allows faster processing of 2D or 3D graphics relative to the application processor unit.

The audio processor unit may process audio-related operations. For example, the audio processor unit may be tasked with converting digital or analog form audio signals through an audio effect or an audio effect unit.

The communication processor unit enables communication between the user device 100 and other devices, and performs functions such as setting a network connection when the user device 100 accesses network communication functions.

The interface 113 connects various devices of the user device 100 and the host device 110.

The external memory device 121 may include a high speed random access memory and/or a nonvolatile memory, such as one or more magnetic disk storage unit, one or more optical storage device, and/or a flash memory (for example, NAND, NOR). The external memory device 121 may also store software including an OS, a communication program, a camera program, a graphic program, one or more application programs, a user interface program, and a codec program, etc. The term "program" may represent a set of instructions or an instruction set designed to execute one or more particular functions. The communication program, the camera program, the graphic program, the one or more application programs, the user interface program, and the codec program may be operated, executed or otherwise coordinated by the OS through various application programming interfaces (APIs).

The OS program may be an embedded OS, such as WINDOWS, LINUX, Darwin, RTXC, OS X, or VxWorks, and may include various software elements controlling general system operations. The control of the general system operations may include memory management and control, storage hardware (i.e., device) control and management, and power control and management, etc. Also, the OS program may also perform a function of smoothing communication between various hardware (i.e., devices) and software elements (i.e., programs).

The communication program may enable communication with a computer, a server, or a user device through the wireless communication device 125 or the external port device 127.

The camera program may include camera-related software elements enabling camera-related processes or functions. The camera program may perform a pre-process where various effects are applied to still images output from the image sensor 122 with the support of APIs, such as an open graphics library, DirectX, etc. A post-process may also be performed, where various effects are applied to still images after capture by the image sensor and storage on the user device 100.

The graphic program may include various software elements in order to provide and display graphic output to the touch screen device 128. The graphic program may generate graphic output with the support of an API, such as an open graphics library, DirectX, etc., and provide various filters capable of adding various effects to the images. The term "graphic" may indicate, for example a text graphic, a web page, a graphical icon, a digital image, a video, an animation, etc. This graphic program may be an image viewer, or an image editing program used to post-process images, or a camera-related program, or a video phone-related program optimized to pre-process images. The graphic program may perform a post-process of applying various effects to images after rendering is completed, or a pre-process of applying various effects to still images.

The application program may include an Internet browser, an email application, an instant messenger, word processor, keyboard emulator, an address book, a touch list, a widget, Digital Right Management (DRM) software, voice recognition software, voice duplication software, a position determining function, and a location based service, etc.

The user interface program may include various software elements suitable to generating and supporting a graphical user interface. Also, the user interface program may include information designating instructions regarding how a state of the user interface should be changed during normal operation, under what conditions a state of the user interface is changed, etc.

The codec program may include software elements related to encoding and decoding of video files.

The external memory device 121 may further include additional programs (i.e., instruction sets) besides the above-described programs. Also, various functions of the user device 100 may be executed by hardware including one or more stream processors and/or an application specific integrated circuit (ASIC), software, or a combination thereof.

The image sensor 122 may provide camera functionality, such as photo and video clip recording, etc. The image sensor 122 may include a charge coupled device (CCD), or a complementary metal-oxide semiconductor (CMOS) sensor. Furthermore, the image sensor 122 may adjust a change of a hardware configuration, such as a lens movement to facilitate a zoom function, or alteration of the focal ratio of an aperture.

Various elements of the user device 100 may be connected to each other through one or more communication buses or stream lines.

The sensor device 123 may include a motion sensor, an optical sensor, or a temperature sensor, etc., and may be utilized to enable various functionality. The motion sensor may sense movement of the user device 100, the optical sensor may sense surrounding light sources, and the temperature sensor may detect a relative degree of heat or cold within the immediate environment.

The GPS reception device 124 may receive signals transmitted from a GPS satellite to calculate a current position of the user device 100.

The wireless communication device 125 enables wireless communication, and may include a radio frequency (RF) transmitter and receiver, or a light (for example, an ultraviolet ray) transmitter and receiver. This wireless communication device 125 may include a module including at least one antenna, and an RF connector, etc. The wireless communication device 125 may be designed to operate in one of a global system for mobile communications (GSM) network, an enhanced data for global evolution (EDGE) network, a code-division multiple access (CDMA) network, a wideband-CDMA (W-CDMA) network, a long term evolution (LTE) network, an orthogonal frequency-division multiple access (OFDMA) network, a wireless LAN, or/and a bluetooth network.

The audio device 126 may be connected to the speaker 1261 and the microphone 1262, perform audio input and output functions, such as voice recognition, voice duplication, digital recording, and phone conversation, etc., and include an audio amplifier. The audio device 126 may allow a user to communicate through the speaker 1261 and the microphone 1262. Also the audio device 126 receives a data signal from the host device 110, converts the received data signal into an electrical signal, and outputs the converted electrical signal through the speaker 1261. The speaker 1261 converts the electrical signal into a signal having an audible frequency band, and outputs the signal. The microphone 1262 may convert acoustic waves output from a human or other sound sources into an electrical signal. Furthermore, the audio device 126 may receive an electrical signal from the microphone 1262, converts the received electrical signal into an audio data signal, and transmits the converted audio data signal to the host device 110. The audio device 126 may include detachable earphones, a headphone, or a headset.

The external port device 127 may directly connect the user device 100 to other user devices, or indirectly connect to other user devices through a network (such as, for example, the internet, an intranet, or a wireless LAN).

The touch screen device 128 may provide an input and output interface between the user device 100 and a user. The touch screen device 128 may adopt a touch sensing technology to transfer a touch input from the user to the host device 110, and to show the user visual information, such as, text, a graphic, or a video provided from the host device 110. The touch screen device 128 may include a display displaying images, and the display may be one of an electro wetting display (EWD), E-Paper, a plasma display panel (PDP), a liquid crystal display (LCD), an organic light emitting diode (OLED), and an active matrix organic light emitting diodes (AMOLED). Also, the touch screen device 128 may include a device receiving a touch, and the device may be one of a digitizer for a stylus pen, a capacitive overlay touch panel, a resistance overlay touch panel, a surface acoustic wave touch panel, and an infrared beam touch panel.

The other input/control devices 129 may include up/down buttons for volume control. Besides, the other input/control devices 129 may include at least one of pointers, such as a push button, a locker button, a locker switch, a thumbwheel, a dial, a stick, and a stylus, etc.

The power supply device 130 may include at least one power management integrated circuit (PMIC). The PMIC may adjust a battery power source. For example, the processor 112 provides to the power supply device 120 an interface signal adjusted to a load to be processed, and the power supply device 130 properly adjusts a core voltage provided to the processor 112 according to the interface signal, allowing the processor 112 to be constantly driven with minimum power. The PMIC may be formed in relation to at least one of the external memory device 121, the image sensor 122, the sensor device 123, the GPS reception device 124, the wireless communication device 125, the audio device 126, the external port device 127, the touch screen device 128, and the other input/control devices 129. Furthermore, a combined PMIC may be formed, and the combined PMIC may adjust battery power sources of not only host device 110, but also at least one of the external memory device 121, the image sensor 122, the sensor device 123, the GPS reception device 124, the wireless communication device 125, the audio device 126, the external port device 127, the touch screen device 128, and the other input/control devices 129.

Figure 2:
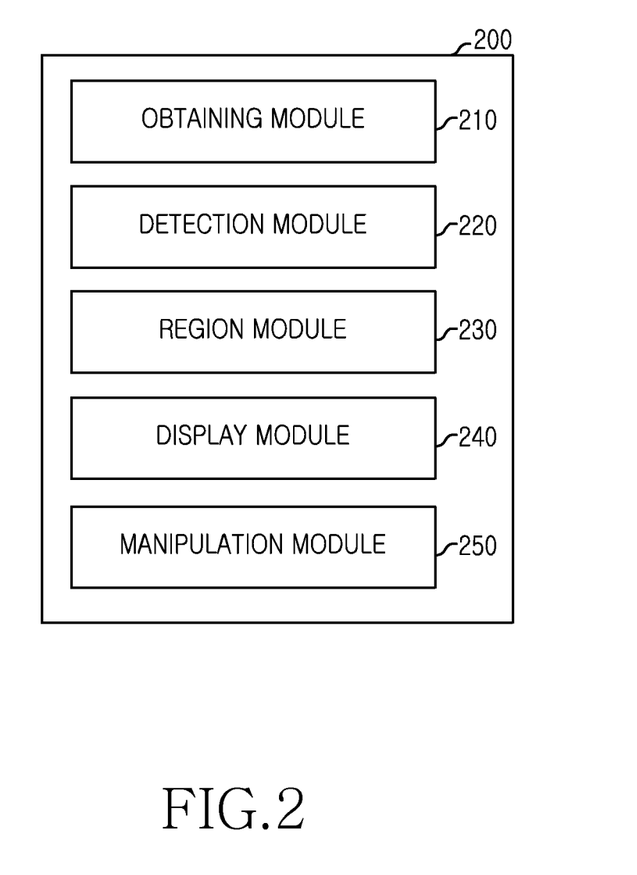
FIG. 2 is a block diagram of an example image processing block according to an embodiment of the present invention.

FIG. 2 illustrates a configuration of an image processing block according to an embodiment of the present invention.

The image processing module 200 may include an obtaining module 210, a detection module 220, a region module 230, a display module 240, and a manipulation module 250.

The obtaining module 210, detection module 220, region module 230, display module 240 and manipulation module 250 may be implemented as hardware components, software components or some combination therein. For example, the modules may all be implemented as interoperable software being executed on the processor 112. Alternatively, some portions of the modules may be implemented as specialized hardware executing specialized instruction sets. Any implementation may be utilized as deemed desirable or advantageous.

The obtaining module 210 may receive a plurality of images from the image sensor 122. The images may be received as a consecutive plurality of images from an image post-processing related function. The obtaining module 210 may alternatively receive the plurality of images from a moving picture. The moving picture may include one of a video, a video picture and a dynamic image.

The detection module 220 may detect non-stationary object image data representing non-stationary objects from the plurality of images. For example, by comparing among pixels of the consecutive plurality of images, the detection module 220 may detect the non-stationary object image data.

The detection module 220 may automatically detect within a first image some of the non-stationary object image data. The detection module 220 may detect within a second image lack of the same non-stationary object image data. The detection module 220 preferably accomplishes this by determining whether a second picture has a low similarity with the first image within the critical area. Therefore, a region or frame region may be automatically determined or input by a user with regard to the first image. The region or frame region may be defined as an area that is consistent across all images within the plurality of images. This frame region, as applied to the primary image, may contain some or all of the non-stationary object.

Accordingly, if the second image has a low similarity relative to the first image, the detection module 220 may determine that the second picture lacks the non-stationary object image data in the frame region. The detection module 220 may measure similarities between the first image and the other images within the plurality of images. Measurement of the similarities may be performed by using a pixel difference, a histogram difference, or a combination of both.

The region module 230 may determine a frame region from an input by a user. For example, the user touches (i.e., for example, contacts, hovers, taps once, taps twice, drags and drops, flicks) proper positions on the touch screen, the region module 230 may determine the frame region from a preset range of the touch screen around the point of contact with the finger. This region may be a rectangular or circular. In addition, the region module 230 may allow the user to set the range of the frame region. For example, when a user connects a touch start point to a touch end point by dragging on the touch screen, the region module 230 may determine the region inside the dragged path. Other variations may be implemented as required.

The display module 240 may display the first image including the at least some of the non-stationary object image data. The display module 220 may display the region in response to, for example, user selection of the region.

The manipulation module 250 may replace image data of the frame region of the first image (containing the non-stationary object) with image data of the same frame region from the second image (which does not contain the non-stationary object).

Figure 3:
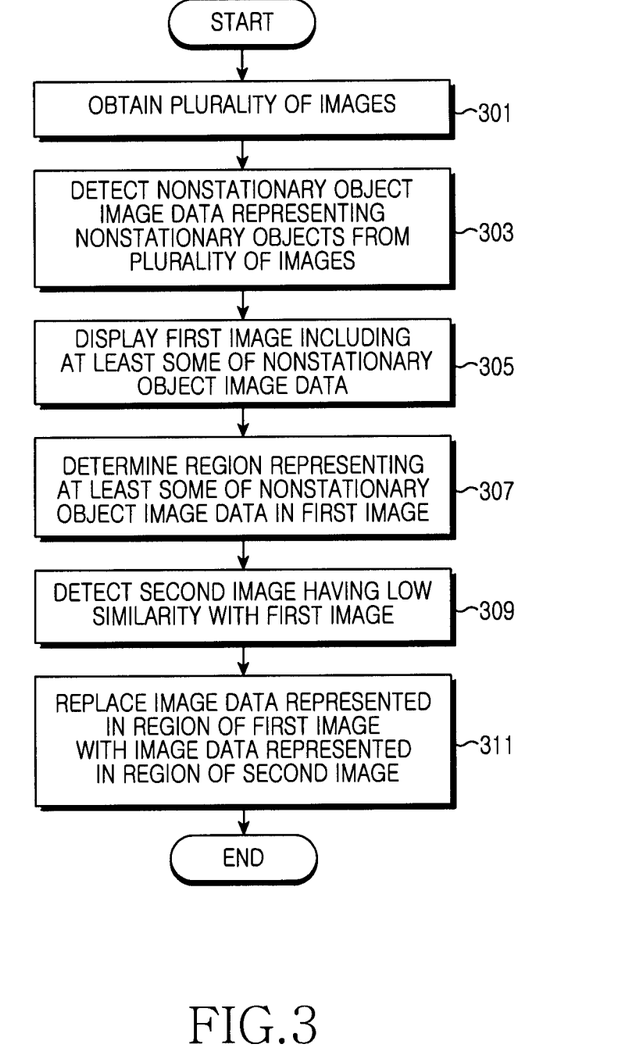
FIG. 3 is a flow chart illustrating an example image processing procedure according to an embodiment of the present invention.

FIG. 3 is a flow chart illustrating an example image processing procedure according to an embodiment of the present invention Referring to FIG. 3, in operation 301, the processor 112 (and/or the obtaining module 210) may receive a plurality of images from the image sensor 122. The processor 112 may alternatively obtain the plurality of image from a moving picture. The plurality of images may capture a single scene across some span of time. For example, a camera on a user device 100 may be set to a burst fire mode so that it rapidly captures a sequence of images.

In operation 303, the processor 112 (and/or the detection module 220) may detect non-stationary object image data representing non-stationary objects within each image in the plurality of images. Non-stationary objects may be detected by a variety of methods. For example, all the images in the plurality of images may be compared against a single image that is selected to be the primary image. All differences between the images surpassing a pre-determined difference threshold may be identified as non-stationary objects.

In operation 305, the processor 112 (and/or the display module 230) may display the first image including at least some of the non-stationary object image data. The first image may be displayed to the user so that, for example, the user may select the region or regions containing one or more non-stationary objects.

In operation 307, the processor 112 (and/or the detection module 220) may determine, select or receive an input designation a frame region of the first image representing at least some of the non-stationary object image. For example, a user may indicate using the touch screen device 128 the frame region within which a non-stationary object resides. Alternatively, the processor 112 (and/or the detection module 220) may determine algorithmically the necessary frame region, based on the identification of non-stationary objects, as described above.

In operation 309, the processor 112 (and/or the detection module 220) may select a second image from the plurality of images. The second images are selected based on the level of similarity it possesses with the first image. Low similarity indicates that the non-stationary object in the frame region from the first image is not present in the same frame region in the second image.

In operation 311, the processor 112 (and/or the manipulation module 240) replaces the image data within the frame region of the first image with the image data within the frame region of the second image, thereby removing the non-stationary object from the image. The resulting composite image may be displayed to the user on the touch screen device 128.

Figure 4:
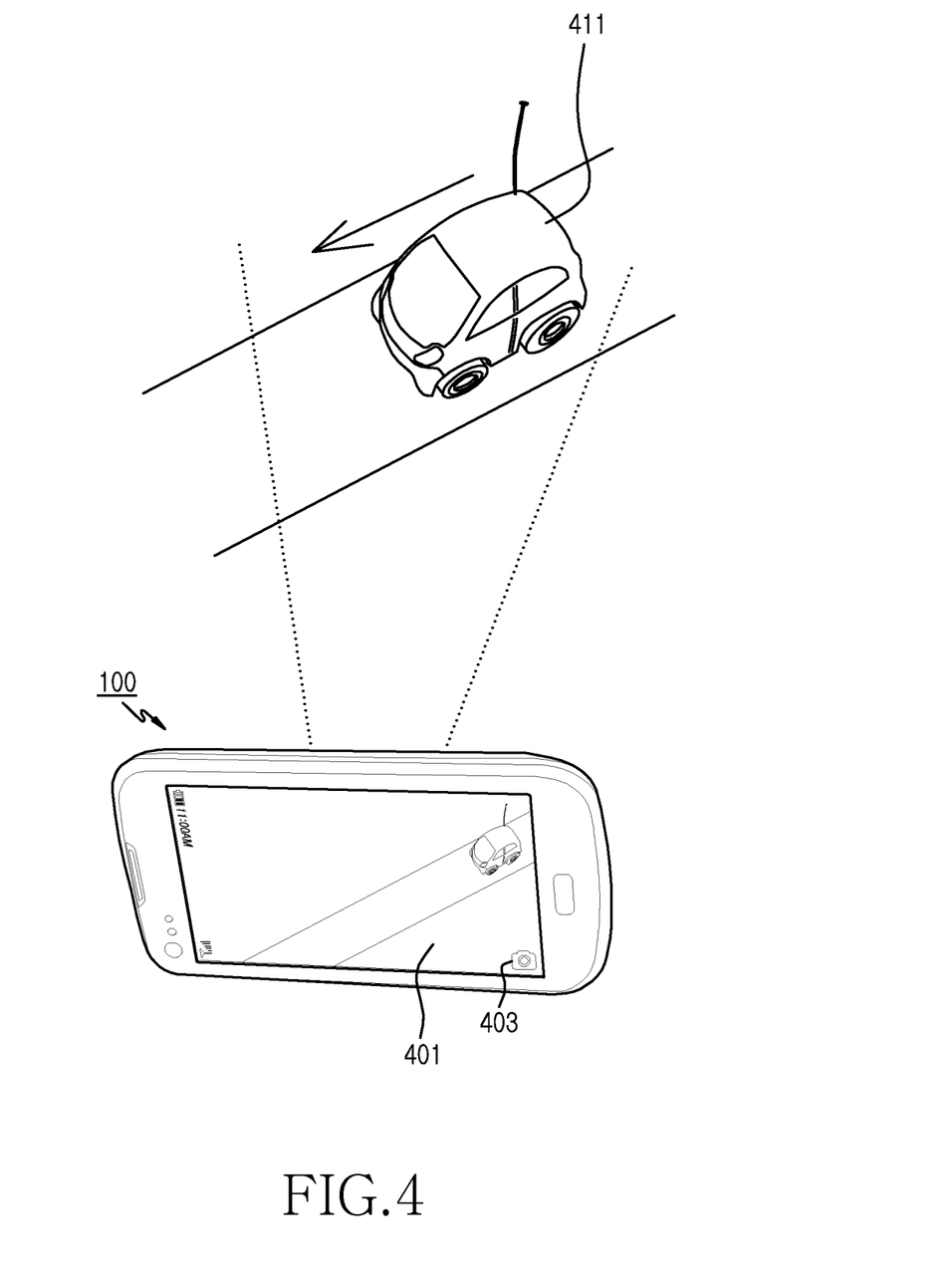
FIG. 4 is an illustration visualizing the photographing of images with a user device.

FIG. 4 is an illustration visualizing the photographing of images with a user device. The user may capture a consecutive sequence of photographs containing a non-stationary subject 411 using the user device 100. The user device 100 may display still images (i.e., preview images) obtained by the image sensor 122 on the display 401. The user device 100 may be set so as to take a number of images at once. For example, the user may hold down the photograph button 403, whereupon the user device 100 may continuously capture images as long as the photograph button 403 is depressed. Alternatively, the user device 100 may be set to a multi-picture mode, such as a "burst" mode, so that a single activation of the photography button 403 may trigger the capture of multiple images. Therefore, when the user pushes down a capture button 403, the user device 100 may obtain a plurality of images.

Figure 5:
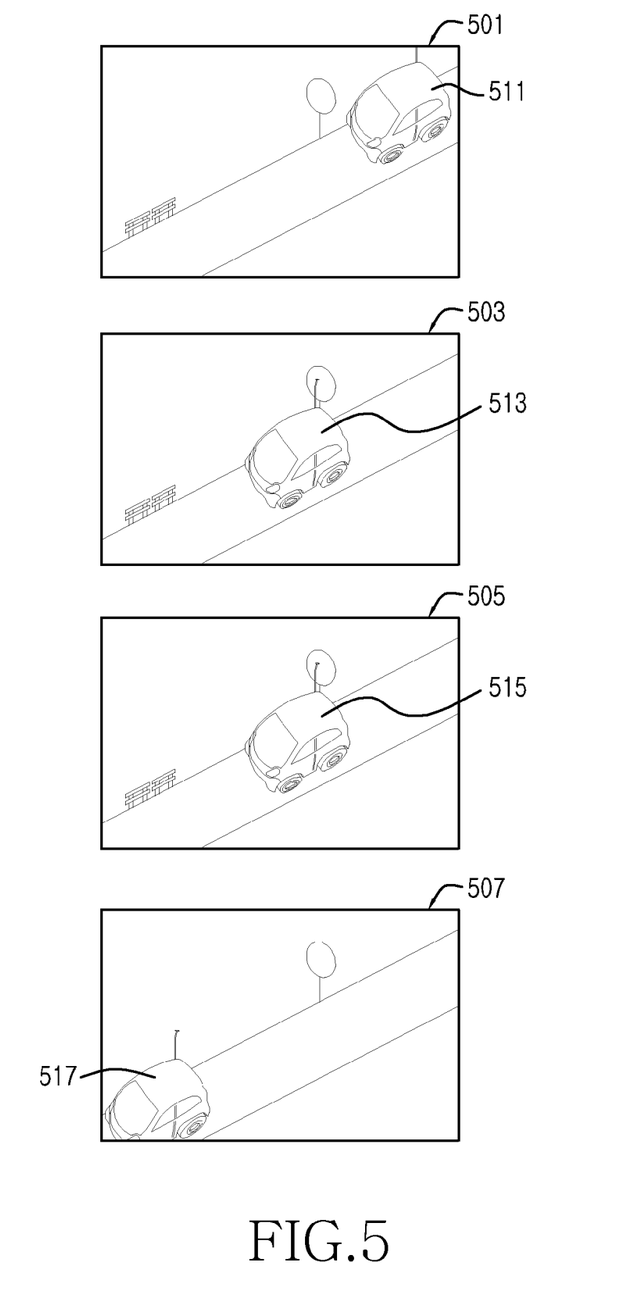
FIG. 5 is an illustration visualizing a plurality of images photographed according to the embodiment of the present invention.

FIG. 5 is an illustration visualizing a plurality of images photographed according to the embodiment of the present invention, showing a sequence of consecutively captured photographs. As described above, a non-stationary object (which in this case is a car) may be represented within consecutively captured images 511, 513, 515, 517. The detection module 220 may detect the moving object by comparing the each image 501, 503, 505, and 507, and determining where the difference lies.

Figure 6A:
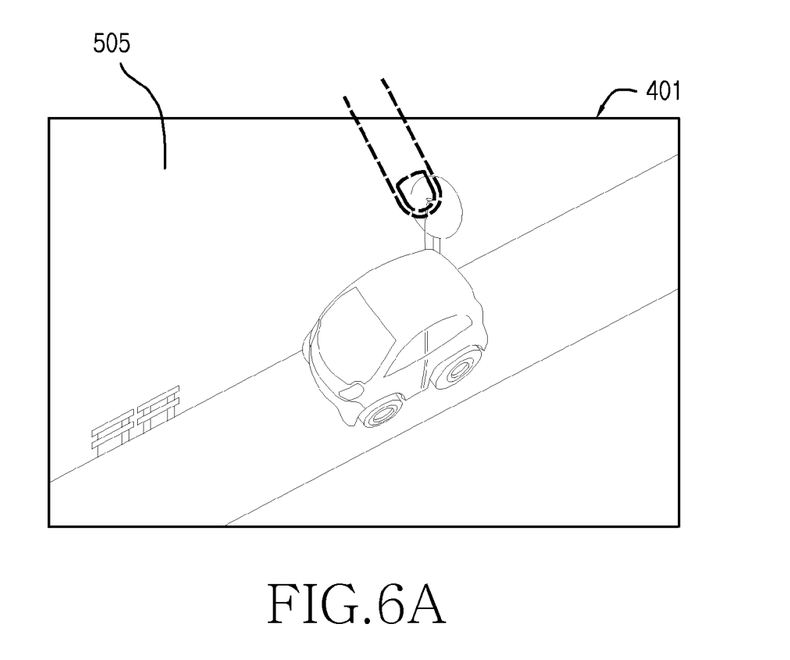
FIG. 6A is an illustration visualizing a screen of the user device according to an embodiment of the present invention.
Figure 6B:
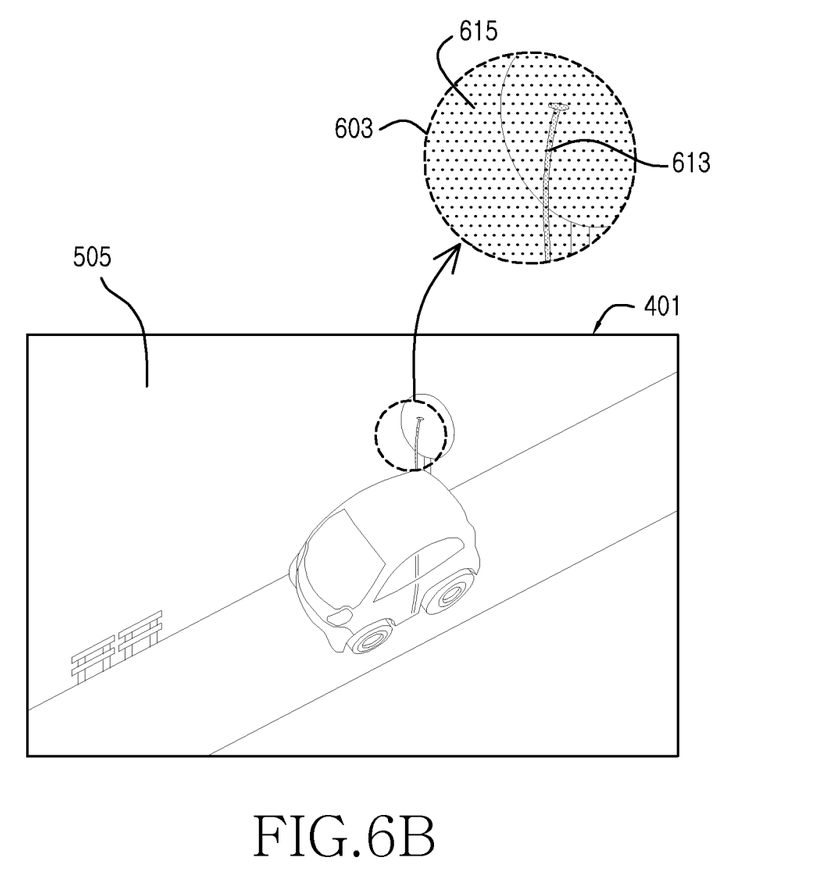
FIG. 6B is an illustration visualizing a screen of the user device according to an embodiment of the present invention.
Figure 6C:
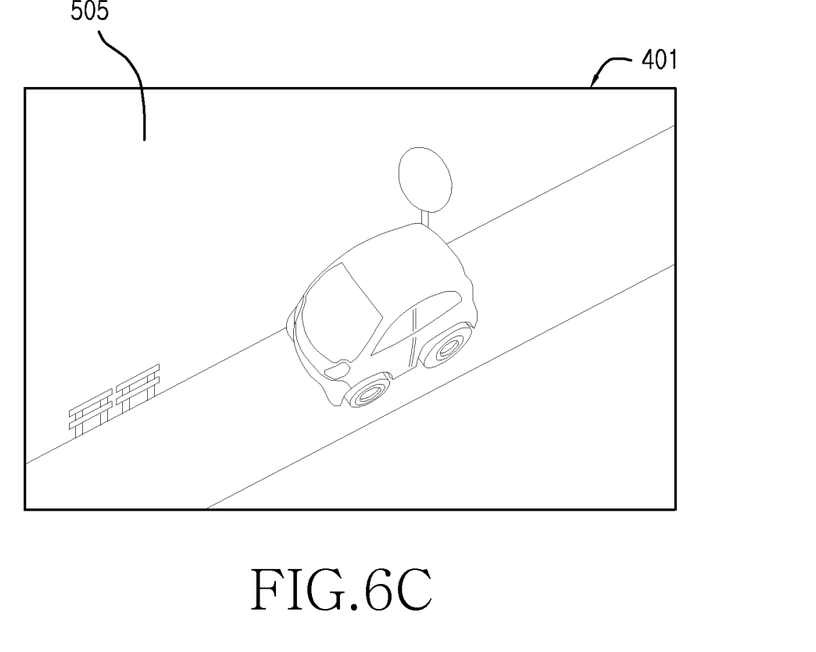
FIG. 6C is an illustration visualizing a screen of the user device according to an embodiment of the present invention.

FIGS. 6A to 6C are an illustrations visualizing a screen of the user device according to an embodiment of the present invention, wherein a user endeavors to delete a non-stationary object. Referring to FIG. 6A, the user device 100 may display a single image 505 that includes the non-stationary object from FIG. 5. The user may touch a position on the screen 401 to indicate or select an appropriate frame region containing the non-stationary object (as represented by the oval). In this case, the non-stationary object selected is the antenna of the car.

Referring to FIG. 6B, the user device 100 may, in response to the user input, display a graphic indicator of the frame region 603 having a predetermined radius around the point indicated by the user. When some or all of the non-stationary object 613 is included in the frame region 603, the user device 100 may replace the image data 615 with image data from a second image having a low similarity to the image 505 (e.g., images 501 or 507 would be suitable) within the frame region 603. As described above, selection of the second image may be made by retrieving an alternate image 501, 503 and 507 that has a low similarity to the present image 505. For example, because image 503 is highly similar to the present image 505 displayed on the screen, the image 503 is not selected for use. Here, image 501 or image 507 are appropriate for selection, as they possess low similarity with present image 505.

Referring to FIG. 6C, the present image 505 may now possess image data in frame region 603 from image 501 (or image 507). Therefore, the antenna that was displayed in image 505 is removed, as there is no antenna shown in the corresponding image data from the same frame region of image 501 (or image 507), and the automobile object appears as if it did not have an antenna.

Figure 7:
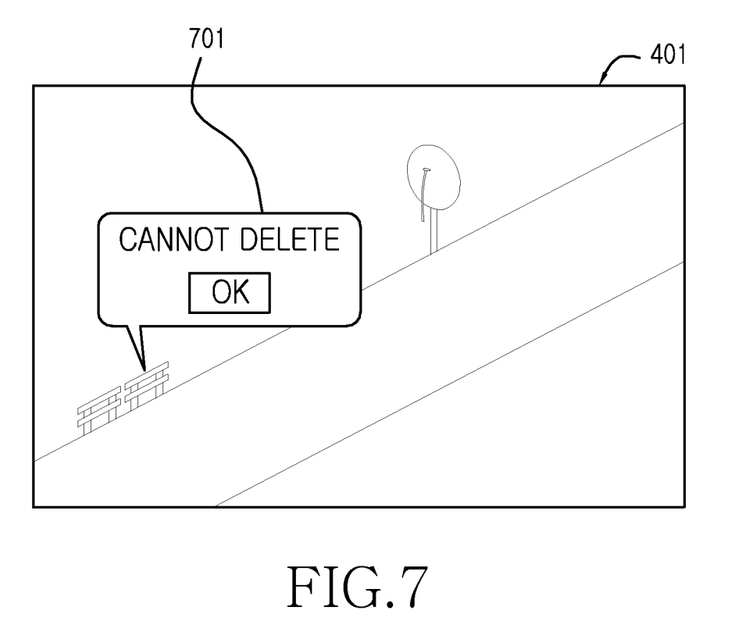
FIG. 7 is an illustration visualizing a screen of the user device according to an embodiment of the present invention.

FIG. 7 is an illustration visualizing a screen of the user device according to an embodiment of the present invention. When the user's designation of a frame region indicates a region that fails to contain non-stationary object data, the user device 100 may output an error message 701. The error message may take the form of, for example, a pop-up message, and may be accompanied by text, graphic or sound. The error message may communicate to the user that deletion within the selection region is not possible because there is no non-stationary object present within the frame region.

Methods according to embodiments described herein can be implemented in hardware, software, or a combined form of hardware and software.

When the methods are implemented as software, a computer-readable storage medium storing one or more programs (i.e., software modules) can be provided. The one or more programs stored in the computer-readable storage medium are configured to be executable by one or more processors in the electronic device. The one or more programs can include instructions allowing the electronic device to execute methods according to the embodiments described herein.

These programs can be stored in a random access memory (RAM), a nonvolatile memory including a flash memory, a read only memory (ROM), an electrically erasable programmable read only memory (EEPROM), a magnetic disc storage device, a Compact Disc-ROM (CD-ROM), a Digital Versatile Disc (DVD) or other types of optical storage device, or a magnetic cassette. The programs can also be stored in a memory formed of a combination of some or all of the above devices. In addition, each type of memory can be utilized in plural.

Furthermore, the program can also be stored in attachable storage devices accessible by the electronic device through a communication network, such as the internet, an intranet, a local area network (LAN), Wide LAN (WLAN), or a storage area network (SAN), or a communication network of a combination thereof. These storage devices can be accessible by the electronic device through external ports.

In addition, a mobile electronic device can access to a separate storage device on a communication network.

According to various embodiments of the present invention, when one of a plurality of consecutively photographed or captured images is displayed on a screen, and a region selected by a user includes at least some of image data representing non-stationary objects, the image data of the displayed image included in the region can be replaced with image data of another image. The user can partially or entirely delete the image data representing the non-stationary objects through region selection using a gesture (for example, a touch, hovering, a single tap, a double tap, a drag and drop, or a flick). The range of the region can be modified according to a user's gesture. Accordingly, when the image data representing non-stationary objects are partially or fully included in the region selected by the user, all the image data may be replaced, thereby removing the non-stationary objects from the image. In addition, when some of the image data representing the non-stationary objects are included in the region selected by the user, the some of the image data can be replaced, removing some of the non-stationary object from the image.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

The functions and process steps herein may be performed automatically or wholly or partially in response to user command. An activity (including a step) performed automatically is performed in response to executable instruction or device operation without user direct initiation of the activity.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of image processing, the method comprising:
receiving images including a non-stationary object, each image taken at a different time;
detecting the non-stationary object in the images;
displaying a first image including the non-stationary object among the images;
detecting a selection of a frame region including a portion of the non-stationary object in the first image and displaying a graphic indicator of the frame region on the display;
selecting a second image having a lowest similarity among the images with image data of the frame region;
replacing the image data of the frame region of the first image with image data of the frame region of the second image such that the portion of the non-stationary object is removed from the first image and another portion of the non-stationary object is maintained in the first image; and
displaying the first image with the replaced image data on a display,
wherein the second image having the lowest similarity indicates an image that is absent the portion of the non-stationary object within the frame region of each of the images, and
wherein the graphic indicator is defined by a radius centered on a point of the non-stationary object indicated by a user input, the radius further modifiable in response to a user gesture.

2. The method of claim 1, wherein the selecting of the second image having the lowest similarity among the images with the image data of the frame region comprises selecting the second image having the lowest similarity based on absence of the portion of the non-stationary object within the frame region of each of the images.

3. The method of claim 1, further comprising receiving the images by consecutively photographing the non-stationary object with an image sensor.

4. The method of claim 1, further comprising receiving the images by consecutively capturing a moving picture.

5. The method of claim 1, further comprising measuring the lowest similarity utilizing at least one of a pixel difference and a histogram difference between the frame region of the first image and frame regions of the images.

6. The method of claim 1, further comprising:
in response to detecting that the selected frame region of the first image fails to include the non-stationary object, displaying a pop-up error message disposed adjacently to a stationary object depicted within the selected frame region, the pop-up error message indicating that deletion within the selected frame region is not possible.

7. An electronic device comprising:
an obtaining module configured to receive images of a non-stationary object;
a display configured to display a first image including the non-stationary object among the images;
a region module configured to detect a selection of a frame region including a portion of the non-stationary object in the first image such that a graphic indicator of the frame region is displayed on the display;
a detection module configured to detect the non-stationary object in the images, and select a second image having a lowest similarity among the images with image data of the frame region; and a manipulation module configured to replace the image data of the frame region of the first image with image data of the frame region of the second image such that the portion of the non-stationary object is removed from the first image and another portion of the non-stationary object is maintained in the first image, and display the first image with the replaced image data via the display,
wherein the second image having the lowest similarity indicates an image that is absent the portion of the non-stationary object within the frame region of each of the images, and
wherein the graphic indicator is defined by a radius centered on a point of the non-stationary object indicated by a user input, the radius further modifiable in response to a user gesture.

8. The electronic device of claim 7, wherein the manipulation module selects the second image having the lowest similarity based on the absence of the portion of the non-stationary object within the frame region of each of the images.

9. The electronic device of claim 7, wherein the obtaining module receives the images by consecutive photography of the non-stationary object with an image sensor.

10. The electronic device of claim 7, wherein the obtaining module receives the images by consecutive capture of a moving picture.

11. The electronic device of claim 7, wherein the detection module measures the lowest similarity using at least one a pixel difference and a histogram difference between the frame region of the first image and frame regions of the images.

12. An electronic device comprising:
at least one processor;
at least one display;
at least one memory; and
at least one program stored in the memory and configured to be executable by the at least one processor to:
receive images including a non-stationary object, each image taken at a different time,
detect the non-stationary object in the images,
display a first image including the non-stationary object among the images,
detect a selection of a frame region including a portion of the non-stationary object in the first image such that a graphic indicator of the frame region is displayed on the at least one display,
select a second image having a lowest similarity among the images with image data of the frame region,
replace the image data of the frame region of the first image with image data of the frame region of the second image such that the portion of the non-stationary object is removed from the first image and another portion of the non-stationary object is maintained in the first image, and display the first image with the replaced image data on a display, wherein the second image having the lowest similarity indicates an image that is absent the portion of the non-stationary object within the frame region of each of the images, and wherein the graphic indicator is defined by a radius centered on a point of the non-stationary object indicated by a user input, the radius further modifiable in response to a user gesture.

13. The electronic device of claim 12, wherein the at least one program comprises selecting the second image having the lowest similarity based on the absence of the portion of the non-stationary object within the frame region of each of the images.

14. The electronic device of claim 12, wherein the at lease one program further comprises receiving the images by consecutively photographing the non-stationary object with an image sensor.

15. The electronic device of claim 12, wherein the at least one program further comprises receiving the images by consecutively capturing a moving picture.

16. The electronic device of claim 12, wherein the at lease one program further comprises measuring the lowest similarity using at least one of a pixel difference and a histogram difference between the frame region of the first image and frame regions of the images.

17. The electronic device of claim 12, wherein the at least one program is further executable by the at least one processor to:

in response to detecting that the selected frame region of the first image fails to include the non-stationary object, control the at least one display to display a pop-up error message disposed adjacently to a stationary object depicted within the selected frame region, the pop-up error message indicating that deletion within the selected frame region is not possible.

* * * * *